United States Patent [19]
Sulzbach

[11] Patent Number: 5,476,638
[45] Date of Patent: Dec. 19, 1995

[54] PROCESS AND DEVICE FOR THE PRODUCTION OF PLASTICS FROM AT LEAST TWO FREE-FLOWING REACTANTS

[75] Inventor: Hans-Michael Sulzbach, Koenigswinter, Germany

[73] Assignee: Maschinenfabrik Hennecke, Leverkusen, Germany

[21] Appl. No.: 898,863

[22] Filed: Jun. 15, 1992

Related U.S. Application Data

[62] Division of Ser. No. 744,566, Aug. 13, 1991, which is a continuation of Ser. No. 446,952, Dec. 6, 1989, abandoned.

[30] Foreign Application Priority Data

Dec. 10, 1988 [DE] Germany .......................... 38 41 671.9

[51] Int. Cl.[6] .................. C08F 2/00; G05D 7/00; B01F 15/02
[52] U.S. Cl. .................. 422/133; 422/135; 422/137; 422/110; 422/112; 366/158.4
[58] Field of Search .................. 422/133, 135, 422/137, 110, 112, 115, 282; 366/154, 155, 156, 160, 161

[56] References Cited

U.S. PATENT DOCUMENTS

| 3,728,056 | 4/1973 | Theysohn | 425/142 |
|---|---|---|---|
| 3,847,022 | 1/1974 | McGinnis | 73/421 R |
| 4,068,831 | 1/1978 | Ebeling et al. | 366/156 |
| 4,242,306 | 12/1980 | Kreuer et al. | 422/133 |
| 4,370,302 | 1/1983 | Suzuoka et al. | 422/137 |
| 4,714,747 | 12/1987 | Bruzzone et al. | 422/137 |

FOREIGN PATENT DOCUMENTS

| 71522 | 1/1960 | France . |
| 1153153 | 8/1963 | Germany . |
| 3507202 | 4/1986 | Germany . |
| 811695 | 4/1959 | United Kingdom . |

*Primary Examiner*—Robert J. Warden
*Assistant Examiner*—Christopher Y. Kim
*Attorney, Agent, or Firm*—Joseph C. Gil

[57] ABSTRACT

The maintenance of the exact metering ratio during the production of plastics, particularly foams, from free-flowing reactants loaded with pulverulent to fine-grained or fibrous additives can be improved by mixing the additive in compacted form in a preliminary mixer with at least one of the reactants. The pressure in the preliminary mixer is kept constant.

3 Claims, 2 Drawing Sheets

5,476,638

PROCESS AND DEVICE FOR THE PRODUCTION OF PLASTICS FROM AT LEAST TWO FREE-FLOWING REACTANTS

This application is a division of application Ser. No. 07/744,566 filed Aug. 13, 1991 now U.S. Pat. No. 5,152,943 which is a continuation of Ser. No. 07/446,952 filed Dec. 6, 1989, now abandoned.

BACKGROUND OF THE INVENTION

The present invention relates to a process and a device for the production of plastics, and particularly foams, from at least two free-flowing, metered reactants. At least one of the reactants is continuously pre-mixed with a pulverulent to fine-grained or fibrous additive in a prescribed ratio under pressure in a preliminary mixing zone. The premixture is subsequently brought together with the other reactant, and continuously mixed. The complete mixture is then allowed to react to completion.

More and more frequently, in order to obtain particular properties in the final product, pulverulent to fine-grained or fibrous additives have to be mixed with the starting components. For example, short glass fibers increase the strength properties. Low-cost fillers make the product less expensive. Pulverized foam scrap can be recycled and the addition of melamine and melamine resins increases the flame resistance.

Metering reactants and additives during continuous mixing at a constant ratio over time presents difficulties. This is due to the fact that pulverulent to fine-grained or fibrous products exhibit large fluctuations in bulk density. Blockages can easily result during metering, so that the throughput is irregular and the metering is inexact.

Substantially pressureless metering of pulverized foam scrap into the polyol component in a preliminary mixer during the production of polyurethane foams has already been attempted (see, e.g., German patent 2,540,934 corresponding to U.S. Pat. No. 4,068,831). A sheath is provided at the feed position. The sheath prevents the additive introduced from settling on the wall as a result of electrostatic charges. In this case exact metering was not so important, and the general metering difficulties with pulverulent products could not be eliminated with this device.

The object of the present invention was to provide a process and a device with which not only the metering ratio of the reactants, but also that of the additive are maintained exactly under continuous operation.

DESCRIPTION OF THE INVENTION

Figure 1:
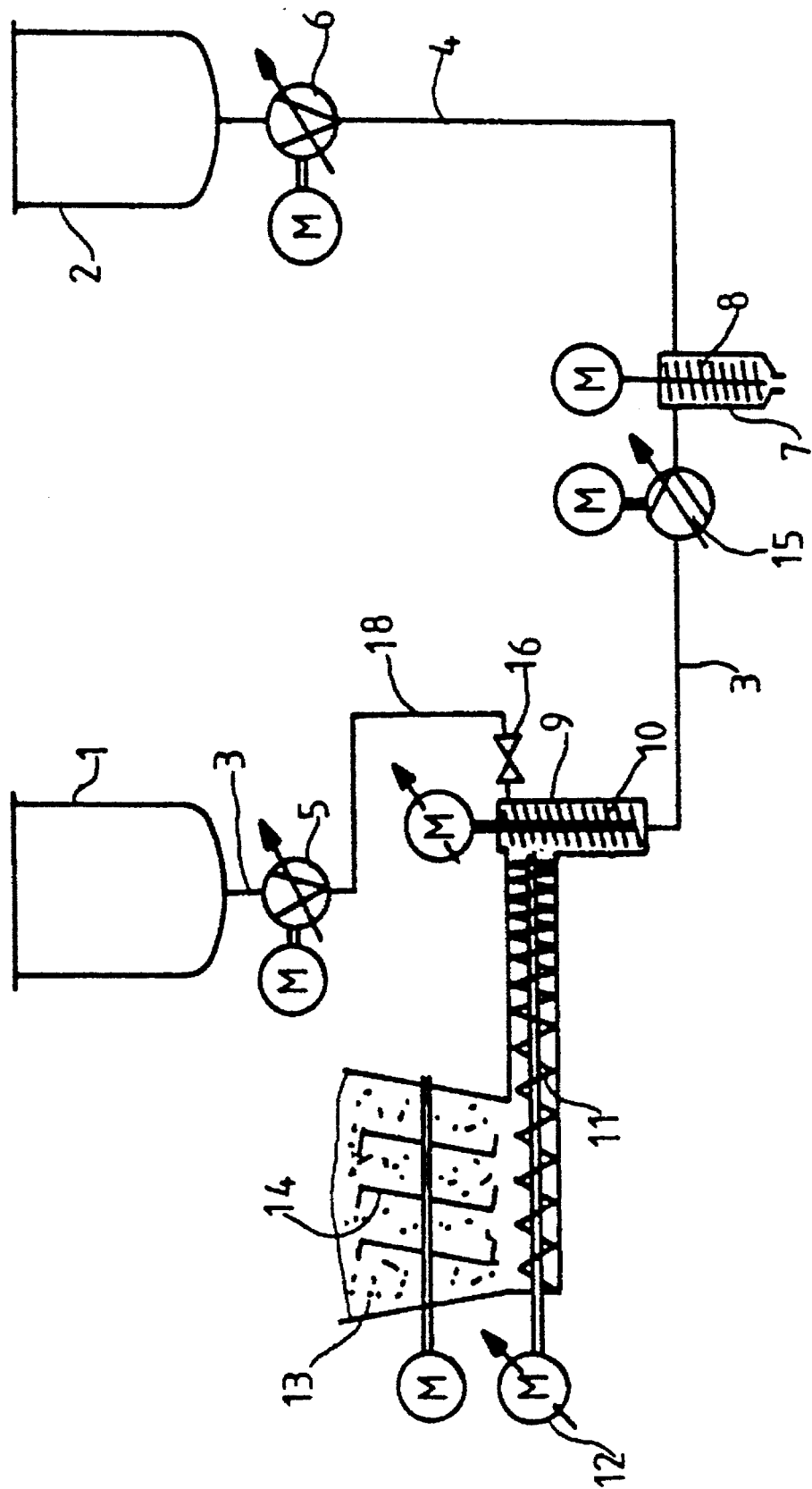
FIG. 1 shows the device according to one embodiment.

The object noted above is achieved in that the additive compacts as it is introduced. The pressure in the preliminary mixing zone is kept constant and the mixture of reactant and additive is metered into the other reactant for the purpose of mixing.

Surprisingly it has been shown that a causal relationship exists between the pressure in the preliminary mixer and the degree of compaction. If the pressure rises above a specific set value this is an indication of too high a degree of compaction and thus of over-metering of the additive introduced. If the pressure falls below the set value, the degree of compaction is too low, so that the additive is correspondingly under-metered. If the pressure is held constant, a quantity by weight of additive which remains uniform over time is metered into the preliminary mixing zone. The uniform metering over time of the free-flowing reactants, particularly via piston metering pumps, has long been state of the art and does not present any difficulties. Obviously, it must be possible to freely select the metering ratios in order to use the novel process for the production of different final products. It has been shown that in most cases a pressure in the preliminary mixer of about 0.5 to 3 bar permits exact metering. A pressure of between 0.8 to 1 bar has proved expedient, for example, when introducing melamine as the additive.

According to a first embodiment of the novel process, the degree of compaction of the additive is adjustable and controllable. In this way a constant pressure in the preliminary mixer can be maintained, which for its part is a characteristic for the exact metering by weight of the additive.

According to a second embodiment of the novel process, the pressure in the preliminary mixing zone is used as the control variable for the degree of compaction. In this case, the pressure in the preliminary mixing zone is measured and compared with a set value and the degree of compaction is readjusted until the set pressure has been reached again.

The novel device for the production of plastics, particularly foams, from at least two free-flowing, metered-in reactants uses storage containers for reactants, from which containers feed lines lead via metering pumps to a mixing head, and a feed screw for introducing a pulverulent to fine-grained additive. The feed screw opens into a preliminary mixer arranged in at least one of the feed lines between the metering pump and the mix head.

According to a first embodiment, the feed screw is designed as a compression screw. Its drive torque is adjustable and controllable. A further metering feed pump is arranged in the feed line between the preliminary mixer and the mix head. A specific pressure corresponds to a specific degree of compaction of the additive by means of the compression screw. This degree of compaction is again adjustable and controllable via the drive torque of the compression screw. The additional metering pump for conveying the mixture of the reactant and the additive ensures that the pressure prevailing in the preliminary mixer remains completely independent of that in the mixing chamber.

According to a second embodiment, the feed screw is also designed as a compression screw. A pressure sensor is arranged at the preliminary mixer, which sensor is connected by means of a signalling line via a set value comparator and rotational speed controller to the drive of the compression screw. A further metering pump is arranged in the feed line between the preliminary mixer and the mix head. The pressure sensor continuously measures the pressure prevailing in the preliminary mixer. This is compared in the set value comparator with the product-specific set value stored there. In the case of deviations therefrom, the pressure is altered via the rotational speed controller of the drive of the compression screw, the rotational speed of which is controllable, in the sense of higher or lower rotational speed and thus in the sense of greater or lesser compaction, in order to restore the normal degree of compaction. Due to the additional metering pump, the pressure prevailing in the preliminary mixer remains completely independent of that in the mixing chamber of the mix head.

It is obvious that if it is to be possible to produce different end products with the novel device it must be possible to alter the rotational speed of the drives of the metering pumps so that the total output and mixing ratios can be correspondingly selected.

Preferably, a shutoff device is arranged between compression screw and preliminary mixer. In this way it is possible to wait until, during start-up, a pressure has built up in the preliminary mixer and a degree of compaction has built up in the compression screw before allowing mixing to commence.

It is also particularly advantageous for the start-up phase to provide the additional metering pump (i.e., that which is arranged between the preliminary mixer and the mix head) with a bypass line having a shut-off device. Material is conveyed through the bypass until the pressure in the preliminary mixer has built up and until a mixture of additive and reactant is present.

The novel device is shown schematically in the drawings in two exemplary embodiments for the production of polyurethane foam from polyol and isocyanate and is described in more detail below.

In FIG. 1, feed lines 3, 4 lead from storage containers 1, 2 for polyol and isocyanate via metering pumps 5, 6 to a mix head 7, equipped with a stirrer 8. A preliminary mixer 9, equipped with a stirrer 10, is arranged in the feed line 3. A compression screw 11, which has a drive 12 with adjustable and controllable torque, opens into the preliminary mixer 9. A feed hopper 13 with a dispersing stirrer 14 is arranged upstream of this compression screw 11. An additional metering pump arranged just upstream of the mix head 7 in the feed line 3 is denoted by 15.

Figure 2:
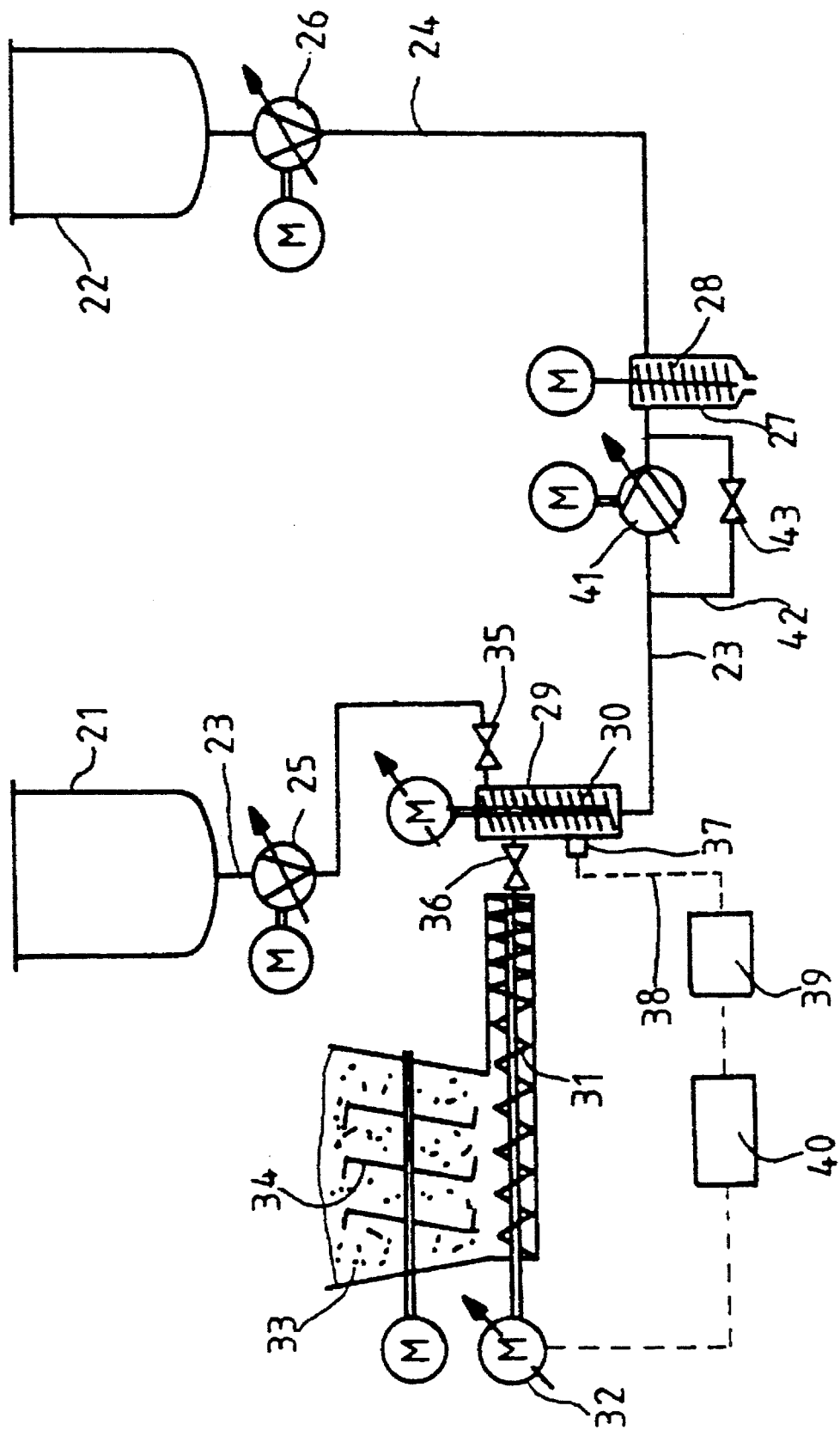
FIG. 2 shows the device according to a second embodiment.

In FIG. 2, feed lines 23, 24 lead from storage containers 21, 22 for polyol and isocyanate via metering pumps 25, 26 to a mix head 27, equipped with stirrer 28. A preliminary mixer 29 with stirrer 30 is arranged in the feed line 23. A compression screw 31, which has a drive 32 whose rotational speed can be controlled, opens into the preliminary mixer 29. A feed hopper 33 with dispersing stirrer 34 is arranged upstream of this compression screw 31. A shut-off valve 35 is arranged in the feed line 23 upstream of the preliminary mixer 29. A shut-off valve 36 is likewise provided between the compression screw 31 and the preliminary mixer 29. A pressure sensor 37 is arranged at the preliminary mixer 29, the sensor being connected to the drive 32 by means of a signalling line 38 via a set value comparator 39 and a rotational speed controller 40. A further metering pump arranged just upstream of the mix head 27 in the feed line 23 is denoted by 41. This metering pump can be bypassed by means of a bypass line 42, in which a shut-off valve 43 is arranged.

EXAMPLES

The device according to FIG. 2 is used. With the shut-off valve 36 closed and the shut-off valves 35 and 43 open, 18 kg/min of polyol and 7 kg/min of isocyanate are conveyed by means of the motoring pumps 25, 26 from the storage containers 21, 22 via the feed lines 23, 24. The compression screw 31 rotates at 125 rpm so that the additive (melamine powder) is compacted. When a compaction has built up in the compression screw 31 and a pressure has built up in the preliminary mixer, the shutoff valve 36 is opened and the shut-off valve 43 is closed. The compression screw 31 then meters 18 kg/min of melamine powder into the preliminary mixer 29. This mixer is fed with polyol. The stirrer 30 rotates at 3000 rpm. A pressure of 1 bar prevails in the preliminary mixer 29, corresponding to the set pressure. The metering pump 41 meters 36 kg/min of the mixture produced in the preliminary mixer 29 into the mix head 27, whose stirrer 28 rotates at 4000 rpm. The mixing pressure in the mixing head 27 is 0.5 bar. The finished foam shows an extraordinarily homogeneous distribution of the melamine powder. If the pressure falls, the rotational speed of the compression screw 29 is increased by means of the control system, as a result of which the degree of compaction rises again to the set value, as does the pressure. If the pressure rises, the rotational speed is controlled lower, so that the degree of compaction falls to the set value, as does the pressure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for the production of plastic products from at least two free-flowing, metered reactants comprising
   a) storage containers for each reactant,
   b) feed lines leading from each storage container via metering pumps to a mix head,
   c) at least one of said feed lines leading from the storage container associated therewith via a first metering pump into a preliminary mixer and from said preliminary mixer to said mix head via a second metering pump,
   d) a feed screw for introducing pulverulent to fine-grained or fibrous additives into at least one of said reactants, said feed screw leading into said preliminary mixer, wherein (i) said feed screw is a compression screw, and wherein (ii) said preliminary mixer is provided with a pressure sensor, said sensor being connected by means of a signalling line via a set value comparator and rotational speed controller to the drive of said compression screw.

2. The device of claim 1, wherein a shut-off device is provided between said compression screw and said preliminary mixer.

3. The device of claim 1, wherein a bypass line is provided around said second metering pump, said bypass line leading from said preliminary mixer to said mix head, said bypass line having a shut-off device therein.

\* \* \* \* \*